Figure 1:
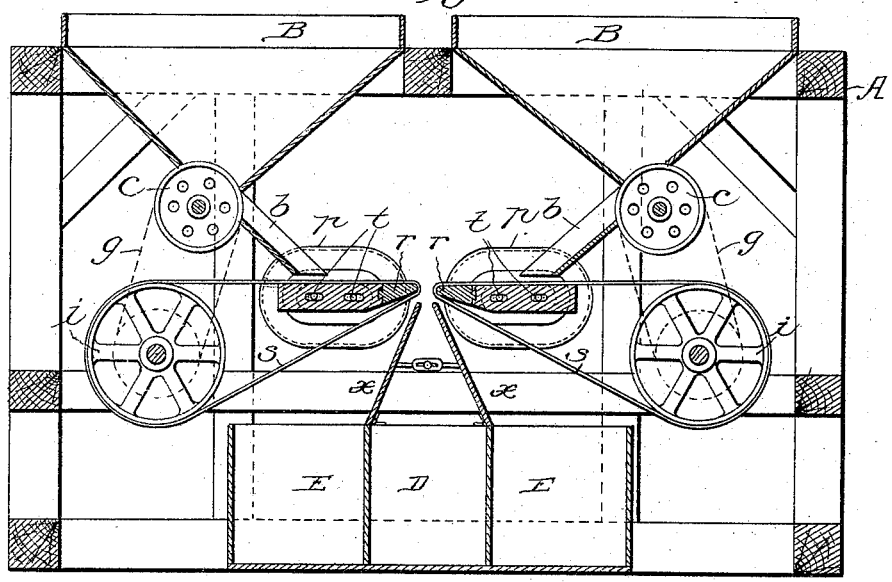

(No Model.)

J. P. WETHERILL.
SEPARATION OF FRANKLINITE ORE AND METALLURGY THEREOF.

No. 555,793. Patented Mar. 3, 1896.

WITNESSES:
Harry B. Rohrer.
Harry G. Davis

INVENTOR
John Price Wetherill,
BY
Seemule & Goldsborough,
ATTORNEYS.

UNITED STATES PATENT OFFICE.

JOHN PRICE WETHERILL, OF SOUTH BETHLEHEM, PENNSYLVANIA.

SEPARATION OF FRANKLINITE ORE AND METALLURGY THEREOF.

SPECIFICATION forming part of Letters Patent No. 555,793, dated March 3, 1896.

Application filed February 10, 1896. Serial No. 578,783. (No specimens.)

*To all whom it may concern:*

Be it known that I, JOHN PRICE WETHERILL, a citizen of the United States, residing at South Bethlehem, in the county of Northampton and State of Pennsylvania, have invented certain new and useful Improvements in Separation of Franklinite Ore and in the Metallurgy Thereof; and I do hereby declare the following to be a full, clear, and exact description of the invention, such as will enable others skilled in the art to which it appertains to make and use the same.

My invention relates to certain new and useful improvements in the separation of the so-called "franklinite ores," found in Sussex county, New Jersey, and in the metallurgy thereof, and has for its object the more remunerative utilization of said ores in the conversion of the native material into its marketable metallurgical products. As is well known, these ores cannot be worked to advantage in the Belgian or other spelter furnace now in use for the direct production of metallic zinc if they contain any substantial percentage of iron or manganese, for the reason that the iron and manganese form a basic slag which attacks the retorts, perforating them and rendering them unavailable for further use. This is an unfortunate circumstance, inasmuch as the metallic zinc obtained from these ores is in demand and of high commercial value, because of its freedom from lead, whereas oxide of zinc, the only other direct metallurgical product into which they can be converted, is in less demand and comes into closer competition with oxide of zinc obtained from other sources.

The native ores of the franklinite deposit vary largely in character according to the particular locality where they are being mined. So far as has been discovered they contain but two minerals sufficient in quantity and of a character suitable for employment in the Belgian or other furnace for the production of metallic zinc. One of these minerals is a native silicate of zinc called "willemite;" but it is so intimately associated in the deposits, in most instances, with one or more of the minerals—franklinite, troostite, garnet or like ferruginous minerals—that it cannot be employed in this mixed condition in the Belgian furnace, wherein from twelve to thirteen per cent. of iron and manganese is the commercial limit. The other available mineral is zincite or native oxide of zinc, and occurs under the same mixed conditions.

The specific gravities of willemite and zincite with respect to the other minerals referred to are so close that it is practically impossible to separate them by jigging, and even jigging, so far as I am aware, has been proposed only for the separation of the franklinite from the willemite, for which purpose I have found it entirely insufficient after many carefully-conducted practical tests. The zincite being of the same specific gravity as the franklinite, of course, cannot be so separated.

In the patents of George G. Convers, dated December 20, 1892, a separation of the franklinite from the willemite and zincite is obtained by subjecting the ore to a preliminary roasting for the purpose of making the franklinite magnetic to such a degree as to be capable of separation by the usual magnetic separators. This procedure, however, involves a considerable expense in the roasting of the ore, and is without effect upon troostite or garnet, which remains as before, silicates incapable of separation by the separators through which the material is subsequently passed.

Willemite or zincite, or either of them, admixed with either garnet or troostite, or both, containing a combined percentage of iron and manganese greater than twelve or thirteen per cent. of the charge could not, prior to my invention, be treated in the Belgian furnace for the production of metallic zinc, and where franklinite, either alone or associated with garnet or troostite, or both, was present with the willemite or zincite, or either of them, in like proportion it could only be removed by first incurring the expense of roasting the entire body of ore. As a consequence much willemite and zincite that could otherwise have been employed for the production of high-grade metallic zinc as a direct product was rejected as necessarily unavailable for that purpose or only in part available after the expense of a preliminary roasting has been incurred. My present invention contemplates the utilization of all such willemite and zincite for the production of metallic zinc and whether admixed with franklinite, garnet, or troostite or any one or more of said minerals and without roasting the ore, thereby rendering one portion of the ore available for the production of metallic zinc and the other portion (except the garnet) available for the production of oxide of zinc and spiegeleisen, to whose percentage of manganese the presence of the troostite contributes in an important degree.

My process permits the separation from the willemite of all the franklinite, garnet or troostite therein present even to a degree less than would be fatal to the Belgian furnace, and thereby insures a maximum charge of practically pure willemite and zincite for the Belgian furnace. It also permits the withdrawal from the willemite of practically all the franklinite and troostite and consequently insures the full utilization of those minerals in the Wetherill or other zinc-oxide furnace and the production of a correspondingly higher grade of spiegeleisen from the residuum of the zinc-oxide furnace. If the willemite and zincite, or either of them, contains garnet, only the separated garnet will be rejected, for the reason that garnet contains no zinc and is objectionable in the zinc-oxide furnace because it forms a slag tending to cake the charge. For a like reason the separated troostite will be rejected if it contains any considerable proportion of garnet. If the separated franklinite contains garnet, however, the franklinite may be removed from the garnet by passing the mixture of unroasted franklinite and garnet into a magnetic field of such a character that the franklinite will be attracted, but not the garnet, as will hereinafter more fully appear.

In carrying out my invention I first crush the native ore to a degree sufficient to separate the various minerals it contains, preferably to a degree sufficient to pass through a sieve of No. 10 mesh. The comminuted material containing willemite and zincite, or either of them, admixed with either franklinite, troostite or garnet, or any combination thereof, is then passed in a thin layer, about one-eighth of an inch thick, below and in close proximity to the pole-pieces of powerful electromagnets and in such manner that the current of ore passes directly through lines of force of a magnetic field of extraordinarily-high condensation, the poles being preferably of a breadth substantially equal to or even somewhat greater than the width of the ore-current, so that the particles of the moving ore-current may be subjected to the same uniform attractive force.

In the accompanying drawings I have illustrated an apparatus suitable for the separation proposed.

Figure 2:
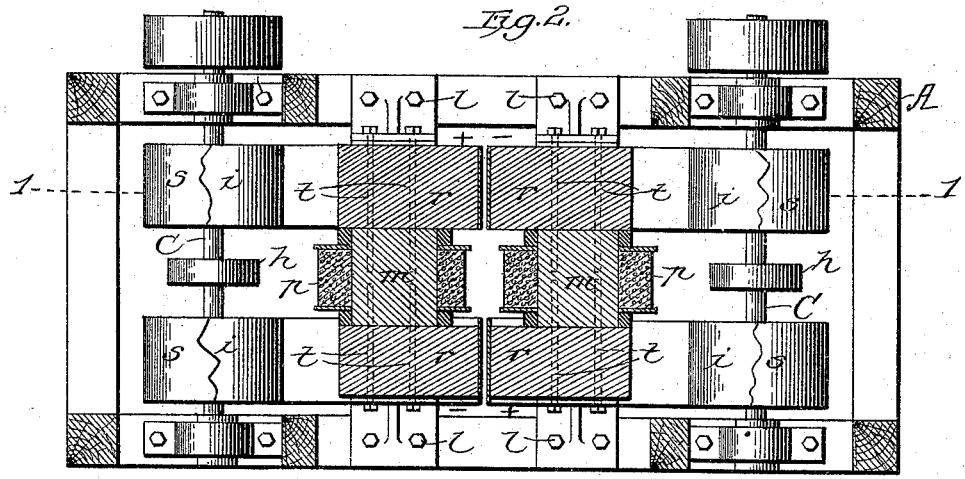

Figure 1 represents a sectional view thereof on a plane indicated by the line 1 1 of Fig. 2, and Fig. 2 represents a plan view partly in section and with the ore-feeding hoppers and chutes omitted.

Similar letters of reference indicate similar parts in both views.

Referring to the drawings, A indicates a suitable frame or housing for the convenient mounting and support of the several parts making up the entirety of the apparatus. In the upper part of the frame are supported the feed-hoppers B B for the reception of the material to be treated, which is crushed or comminuted to a degree sufficient to break apart from each other the particles to be separated. At the bottom of each hopper B is located a device for feeding the material in an even layer of graduated thickness to a chute $b$, said device consisting preferably of a feed-roller $c$ occupying the bottom of the hopper and which may be so located therein as to provide a feed-opening of the proper dimensions suitable to the desired thickness of the layer of ore to be fed therefrom.

Each feed-roller $c$ receives a constant motion of rotation from a belt $g$ driven from a pulley $h$ upon a power-shaft C actuated from any suitable source of power, and upon the same power-shaft C are mounted pulleys $i$ for driving the conveyer-belts, as hereinafter described. Transverse to the frame are secured the electromagnetic elements of the invention. In the form represented in the drawings the electromagnetic elements are supported from suitable brackets $l$ bolted to the machine-frame, and each is made up of a core $m$ provided with a bobbin having a wrapping of wire coils $p$, the two coils being in series with each other, and the direction of winding of the two coils being such as to produce opposite polarities in their respective pole ends. The pole-pieces $r$ are adjustable toward each other preferably through the intermediacy of the screw-bolts $t$ passing through elongated slots made through the body portion of the pole-pieces. The adjustment of the pole-pieces is toward and from each other in a direction transverse to the longitudinal axis of the cores, and the pole-pieces are made of sufficient length that they will, when adjusted as closely together as is contemplated, still entirely cover the proximate ends of the cores. The extreme ends of the pole-pieces are made removable and replaceable, when worn, by means of a dovetail joint, as indicated, and over and about these ends extend conveyers which feed the material forward laterally into the magnetic field. These conveyers consist preferably of endless belts $s$ of thin linen or canvas passed over the actuating-pulleys $i$.

It will be noted that the cross-sectional area of the cores $m$ and of the main body portion of the pole-pieces are substantially equal. They have therefore practically the same magnetic carrying capacity, so that the magnetic lines of force may not be dispersed upon entering the pole-pieces. At their ends, however, the pole-pieces taper toward each other, thereby decreasing in cross-sectional area and causing a corresponding condensation or crowding together of the magnetic lines of force so as to form a concentrated magnetic field of extraordinary attractive power.

The operation of the apparatus is as follows: The ore is fed from the hoppers B and chutes b to the conveying-belts in a layer of about one-eighth of an inch in thickness and is fed forward into the condensed magnetic field at a speed of about fifty-five feet per minute. As the ore enters the magnetic field, the particles of native franklinite, garnet, or troostite are arrested and detained momentarily in contact with the surface of the conveyers as they pass over the polar extremities, while the willemite or zincite are carried onward slightly so as to fall into the central space between the pole extremities and into receptacles D provided for their reception. The continued movement of the conveyers carries the particles arrested by the attraction of the polar extremities out of the range of such attraction, whereupon they fall from the surface of the conveyer and are deflected by the hinged leaves x into receptacles E. Where the attracted particles are of very low magnetic permeability, they fall from the polar extremities almost immediately after having rounded them, and for this reason the hinged deflecting-plates are carried well up to the pass or interval between the poles, so that the possibility of subsequent commingling of the separated products may be avoided. The degree of separation of the hinged leaves is also capable of accurate adjustment by means of a set-screw and slotted links, as shown.

In practice I have found it suitable to give to the magnet-cores a cross-sectional area of about 26.87 square inches, (the pole-pieces being of the relative size indicated in the drawings,) the cores being each wound with ten hundred and fifty windings of No. 10 copper wire, and the speed of travel of the belts being about fifty-five feet per minute. Under these conditions, and with the pole-pieces separated at about one and a quarter inches apart the greater part of the native franklinite can be removed by passing a current of four ampères and fifty-five volts through the coils.

By decreasing the separation of the poles to three-quarters of an inch the troostite and garnet can be removed (together with the remainder of the franklinite, if any,) from the tailings of the first operation, which tailings would still be rated as franklinite ore, the ampèrage being preferably raised to seven, so as to effect as complete a separation as possible. In most cases it will be found advisable to pass the tailings several times through the machine, or once through a series of three or four like machines, in order to produce the best results.

Where franklinite and garnet are present in the "heads," I have ascertained that their difference in magnetic susceptibility is such that by slightly lowering the ampèrage of the current or by slightly increasing the separation of the pole ends the strength of the field can be lowered to such an extent as to remove the franklinite and leave the garnet, when the mixture of franklinite and garnet is passed through the machine. This is a feature of special advantage, for the reason that after the removal of the main portion of the franklinite, which I prefer to effect in the first passage of the ore through the machine, and which I term the "roughing" operation, I can at once increase the strength of the field sufficiently to insure the complete removal of practically all remaining franklinite and garnet and can then separate the franklinite and garnet without again passing the willemite or zincite tailings through the machine. After passing through the separator the willemite and zincite portion of the ore is sized and jigged to separate the calcite from it.

In the trade such minerals as are capable of use in the Belgian or other zinc-producing furnaces are called "zinc ores" for the reason that they are adapted for the direct production of metallic zinc. The separated willemite and zincite are such zinc ores, and that designation as employed in the claims is intended to cover either or both of said minerals.

Having thus described my invention, what I claim is—

1. The improvement in separating franklinite ore, which consists in comminuting the ore, inductively magnetizing the mineral franklinite in its natural state therein by subjecting it to the action of a highly-condensed magnetic field, and withdrawing said mineral franklinite by magnetic attraction; substantially as described.

2. The improvement in separating franklinite ore, which consists in comminuting the ore, subjecting it to the action of a highly-condensed magnetic field, and withdrawing troostite from the ore by magnetic attraction; substantially as described.

3. The method of separating paramagnetic materials of different permeability, from mixtures containing them, which consists in subjecting the mixture to the action of a magnetic field sufficiently condensed to remove said paramagnetic material and then separating the removed paramagnetic material into its components by subjecting it to the action of a magnetic field reduced in intensity sufficiently to leave the less permeable component, but sufficient to remove the component of higher permeability; substantially as described.

4. The improvement in separating franklinite ore, which consists in comminuting the ore, subjecting it to the action of a magnetic field of such high condensation as to attract and remove the mineral franklinite in its natural state and garnet, and then subjecting the mixture of separated franklinite and garnet to the action of a less intense magnetic field of sufficient condensation to attract and remove the franklinite but not the garnet; substantially as described.

5. The improvement in the metallurgy of franklinite ores, which consists in separating franklinite, garnet and troostite from the zinc ores of the native ores by passing the mixture through a highly-condensed magnetic field, and then reducing said zinc ores for the production of metallic zinc; substantially as described.

6. The improvement in the metallurgy of franklinite ores, which consists in separating garnet and troostite from the zinc ores of the native ores by passing the mixture through a highly-condensed magnetic field, and then reducing the said zinc ores for the production of metallic zinc; substantially as described.

7. The improvement in the metallurgy of franklinite ores, which consists in separating garnet from the zinc ores of the native ores by passing the mixture through a highly-condensed magnetic field, and then reducing said zinc ores for the production of metallic zinc; substantially as described.

8. The improvement in the metallurgy of franklinite ores, which consists in separating troostite from the zinc ores of the native ores by passing the mixture through a highly-condensed magnetic field, and then reducing the said zinc ores for the production of metallic zinc; substantially as described.

9. The improvement in the metallurgy of franklinite ores, which consists in separating franklinite and troostite from the zinc ores of the native ores by passing the mixture through a highly-condensed magnetic field, and then converting the separated products into their ultimate metallurgical products; substantially as described.

In testimony whereof I affix my signature in presence of two witnesses.

JOHN PRICE WETHERILL.

Witnesses:
   HUGH M. STERLING,
   JOHN C. PENNIE.